United States Patent
Simon et al.

(10) Patent No.: US 9,116,356 B2
(45) Date of Patent: Aug. 25, 2015

(54) SYSTEM FOR REPRODUCING STEREOGRAPHIC IMAGES

(75) Inventors: Arnold Simon, Neu-Ulm (DE); Thomas Mueller, Ulm (DE); Helmut Jorke, Gerstetten (DE)

(73) Assignee: Infitec GmbH, Ulm (DE)

( * ) Notice: Subject to any disclaimer, the term of this patent is extended or adjusted under 35 U.S.C. 154(b) by 324 days.

(21) Appl. No.: 12/714,917

(22) Filed: Mar. 1, 2010

(65) Prior Publication Data

US 2010/0149635 A1     Jun. 17, 2010

Related U.S. Application Data

(63) Continuation of application No. PCT/DE2008/001370, filed on Aug. 21, 2008.

(30) Foreign Application Priority Data

Aug. 31, 2007   (DE) ............... 20 2007 012 236 U

(51) Int. Cl.
| | |
|---|---|
| G02B 27/22 | (2006.01) |
| H04N 13/04 | (2006.01) |
| G03B 35/26 | (2006.01) |

(52) U.S. Cl.
CPC ............ *G02B 27/2207* (2013.01); *G03B 35/26* (2013.01); *H04N 13/0422* (2013.01); *H04N 13/0431* (2013.01)

(58) Field of Classification Search
CPC .................... H04N 13/0422; G02B 27/2207
USPC ............. 359/462, 464; 348/60; 362/610, 616; 349/15
See application file for complete search history.

(56) References Cited

U.S. PATENT DOCUMENTS

| | | | |
|---|---|---|---|
| 6,698,890 B1 | 3/2004 | Jorke | |
| 7,246,932 B2 * | 7/2007 | Burtsev et al. | 362/616 |
| 7,287,860 B2 * | 10/2007 | Yoshida et al. | 353/31 |
| 7,916,221 B2 * | 3/2011 | Daiku | 349/15 |
| 2005/0007390 A1 | 1/2005 | Yoshida et al. | |

(Continued)

FOREIGN PATENT DOCUMENTS

| | | |
|---|---|---|
| DE | 198 08 264 A1 | 11/1998 |
| DE | 199 24 167 A1 | 12/2000 |

(Continued)

*Primary Examiner* — Audrey Y Chang
(74) *Attorney, Agent, or Firm* — Muncy, Geissler, Olds & Lowe, P.C.

(57) ABSTRACT

A system for reproducing stereographic images is provided that includes a display unit that has a pixel array for representing image data which reproduces the same when controlled with stereoscopic image data, and a light source for fully illuminating the pixel array. The system further includes a pair of glasses that are suitable to make the reproduced stereoscopic image data available to a wearer of the pair of glasses in an eye-selective manner. The display unit has at least one additional light source for fully illuminating the pixel array. Every light source is additionally configured to emit light in a plurality of narrow spectral ranges, thereby defining a color range, the spectral ranges of the light sources being orthogonal to each other. The system also includes a control unit that sequentially operates the light sources. The pair of glasses has optical glasses, spectral transmission ranges of which are orthogonal to each other and correspond to the spectral ranges of the light sources in such a manner as to allow the reproduction of stereographic images in a reliable and cost-effective manner.

12 Claims, 12 Drawing Sheets

(56) References Cited

U.S. PATENT DOCUMENTS

2007/0274099 A1* 11/2007 Tai et al. .................. 362/610
2008/0158672 A1* 7/2008 McCosky ................. 359/464

FOREIGN PATENT DOCUMENTS

| WO | WO 2004/038457 A2 | 5/2004 |
| WO | WO 2007/095476 A2 | 8/2007 |

* cited by examiner

SYSTEM FOR REPRODUCING STEREOGRAPHIC IMAGES

This nonprovisional application is a continuation of International Application No. PCT/DE2008/001370, which was filed on Aug. 21, 2008, and which claims priority to German Patent Application No. 20 2007 012 236.5, which was filed in Germany on Aug. 31, 2007, and which are both herein incorporated by reference.

BACKGROUND OF THE INVENTION

1. Field of the Invention

The invention relates to a system for the stereoscopic reproduction of images, such as video clips, films, etc.

2. Description of the Background Art

There are various techniques for three-dimensional reproduction. The anaglyph technique has been long known: A stereoscopic impression forms for the viewer by simple red/green superimposition of both left/right partial images and viewing of the total image through filter glasses, which let through only the corresponding color component for a particular eye. A drawback here is the system-related color filtering, so that no realistic color images can be reproduced with this technique.

Another method, occasionally used in television, is the Pulfrich method. Here as well, glasses are used for viewing, whereby the light beam for one eye is darkened more greatly than for the other, however. For this purpose, color glasses are also frequently used (for reasons of cost), although it is only a question of the different darkening. Because of the different brightness, the visual information reaches the processing areas of the brain with a slight delay. If a shown scene moves at a right angle to the viewer, parallax therefore results for an eye because of the time delay in the perception and the scene is perceived spatially. The advantage of this technique is the simplicity of the reproduction technique. It is disadvantageous that the scene must be in constant motion, which is often perceived as unpleasant after a certain time period. In addition, the scene must always move in the same direction, because otherwise the depth information would reverse. The motion speed must also be kept constant, because otherwise the depth information cannot be rendered correctly.

In the computer field, a different method is often used: The right/left components in this regard are separated by so-called shutter glasses, which by means of electrically switchable polarization filters let light through, e.g., from a monitor or projector, alternately only for the viewer's right or left eye. The shutter glasses in this regard are synchronized with the display device (e.g., a monitor), so that of the alternating sequence, shown there, of left/right partial images accordingly only the specific partial images reach the left or right eye. This technique in fact offers a true-color reproduction but does have the drawback that the brightness is greatly reduced, because (alternately) the image reproduction is perceived only by one eye of the viewer (therefore only half of the total brightness of the monitor) and in addition the polarization filters on their own already absorb light (in the transmission phase as well). In addition, the constant left/right fade-out requires a very high refresh rate (at least 120-160 Hz) so that an interfering flicker effect is suppressed.

Another principle is based on interference filter technology. A method for generating an image reproduction, perceptible optically three-dimensionally, according to the interference filter technology or a corresponding stereoprojection system is known from DE 199 24 167 B4, which corresponds to U.S. Pat. No. 6,698,890. In this regard, two interference filters with a slightly different spectral filter effect are used for projection. The passbands of both filters in this regard are arranged shifted relative to one another such that they have no overlap and are therefore formed orthogonal to one another. With the use of both interference filters, which are orthogonal to one another and which, in each case, have three passbands for the three primary valences in the range of blue, green, and red color perception, two separate images, one for the left eye and one for the right eye, can be realized with the help of which a three-dimensionally perceptible image can be projected onto a screen. This image is perceived by a viewer selectively by the separate eyes in that he has a pair of glasses whose left lens has a filter characteristic according to the one interference filter and the right lens a filter characteristic according to the other interference filter. As a result, both images can be reliably separated from one another in an eye-specific manner on the screen and create the stereo effect or the three-dimensional effect of the images in the viewer. The term wavelength-division multiplexing method is also used.

SUMMARY OF THE INVENTION

It is therefore an object of the invention is to provide a system for reproducing stereo images with a display unit, which has good color reproduction and moreover has a simple and reasonably priced design.

The system of the invention for reproducing stereo images includes the concept of integrating the wavelength-division multiplexing method for backlighting of the pixel array of the display unit with the concept of time-division multiplexing of the backlighting in conjunction with the corresponding time-division multiplexing of the control of the pixel array of the display unit with "left" or "right" images of the stereo images. This assures that the image data of the stereo images are presented sequentially according to the time-division multiplexing concept with the aid of the pixel array and, in this regard, at substantially the same time are made distinguishable and therefore separable with the aid of the wavelength-division multiplexing concept. The separation of the stereo images then occurs by the viewer's stereo glasses, whose lenses are formed according to the wavelength-division multiplexing method and correspond to the spectral characteristics of the selective backlighting.

A very reliable separation of the stereo images is assured by this novel approach to a system for reproducing stereo images, without this resulting in considerable costs for realization of the display unit.

This is also associated with a simple and cost-effective realization of the stereo glasses for the user of the system of the invention. The display unit of the invention in this regard is substantially independent of the employed pixel array technology, so that depending on other technical, particularly external conditions or basic cost-related conditions, the pixel array technology, suitable in the particular case, e.g., LCD, TFT technology and the like, can be used.

The system of the invention is attractive because of the very low to absent crosstalk behavior of the two stereo channels and excellent wearing comfort of the glasses and the mobility of the user because the glasses are or can be decoupled mechanically and electrically from the display unit.

According to an embodiment of the system of the invention for reproducing stereo images, the at least two luminous sources can be identical in terms of a type of light source. For example, light-emitting diodes in particular, which are formed particularly as a linear array of LEDs, fluorescent tubes or gas-discharge lamps, preferably as rod-shaped halogen lamps or flash lamps, have proven themselves. They represent very bright and compact light sources for the luminous sources of the display unit, which in addition are notable for reduced heat production and thereby enable a very compact and less fragile realization of the display unit of the invention.

In this regard, the display unit can be provided with a flat, rectangular housing, whose dimensions are determined, for example, substantially by the format of the pixel array.

The luminous sources can be selected so that they contain light sources that generate light for the full-surface illumination of the pixel array in a way that they generate light with no additional components which emits a plurality of narrow spectral regions, separated from one another, so that the one luminous source emits spectral ranges that are orthogonal to the spectral ranges of the other light source or light sources. In this way, the number of components are minimized by the appropriate choice of luminous sources and thereby realizing the system for reproducing stereo images in a very simple and less fragile manner.

In addition, it has proven effective to provide broadband light sources in the luminous sources to which filters with a plurality of narrow-band transmitting intervals are assigned for the realization of the orthogonal spectral ranges. This realization of the system of the invention makes it possible by the matching of the filters in their characteristics to realize different systems that are adapted to different basic external conditions, without costly system modifications being required, particularly with regard to the energy supply or heat management.

Another embodiment of the invention provides that the color filters for both images of the stereo image in the display unit and/or in the lenses of the stereo glasses can be designed so that the number of transmitting intervals is reduced numerically compared with the conventional art. The invention provides a number of transmitting intervals for both perspective partial images, which is equal to or less than 6, particularly 5 or 4. Of these 5 or less transmitting intervals, which have no mutual overlap, at least one transmitting interval has an arrangement in the range of two color perceptions of blue (B), green (G), or red (R). The other transmitting intervals are arranged in the frequency spectrum such that they are arranged within the range of a single color perception, therefore, blue or green or red. These transmitting intervals for color perception have a bandwidth within the range of about 30 nm or significantly lower, as a result of which a reliable differentiation and arrangement within a range of color perception is possible and there is a reliable demarcation or separation from the other transmitting intervals. To this end, the transmitting intervals are arranged such that they have a sufficient distance to one another.

In particular, for use in darkened environments, a selected system for reproducing stereo images has proven successful, in which all luminous sources are on the same side of the pixel array as the viewer with the stereo glasses assigned to the viewer. In this regard, the pixel array is acted upon with the reflected light of the multiple luminous sources, making it possible to realize a very large-area pixel array, which is illuminated over the entire surface by offset luminous sources, without an optical impairment of the reproduction of stereo images occurring.

Alternatively, it has proven successful to arrange the luminous sources and the viewer on different sides of the pixel array, and to drive the pixel array and thereby the display unit in a transmitted light mode. This has the result that a very compact realization of the display unit with its housing is made possible without detrimentally affecting the area between the viewer and the pixel array.

Especially compact embodiments of the display unit of the invention are enabled by the use of light guides for light distribution of the light from the luminous sources in the direction of the pixel array. By arranging the light sources on the other side of the pixel array relative to the viewer, operation even under difficult optical conditions, especially in the presence of stray light, is made possible, which greatly broadens the possible uses of the system of the invention and thereby reduces the requirements for the individual components of the system of the invention, which is associated with a reduction in total cost of the system of the invention.

Another embodiment of the system according to the invention can have one or more light guides for the most uniform, two-dimensional distribution of light possible in the direction of the pixel array. At least one light guide in this regard can have multiple front surfaces for receiving the light from multiple luminous sources. Each front surface can be assigned a light source from a luminous source that can have a broad-band radiation pattern and is provided with a filter with a plurality of narrow-band transmission ranges for the realization of the orthogonal spectral ranges of the different luminous sources.

The filter of a luminous source can be applied by adhesion or arranged directly on the front surface, assigned to the luminous source, of the light guide. This assures a very reliable and low-loss coupling of light from the luminous source in the light guide.

According to an embodiment of this system, the various luminous sources, which are coupled into different front surfaces of the light guide, are separated from one another in a light-technology manner by an opaque separating layer or separating wall so that crosstalk of the luminous sources, operated sequentially and therefore in time-division multiplexing, is reliably prevented also during entangled operation. As a result, very reliable channel separation is achieved and a very pleasant stereo image reproduction behavior is assured.

According to a further embodiment, the pixel array can be divided spatially into different segments separated from one another. For example, the pixel array can be divided into two segments separated vertically from one another, an upper and a lower segment. The luminous sources are formed and controlled so that they can impinge the individual segments selectively and sequentially with light, whereby the pixels of the pixel array are controlled in segments, so that at the time of illumination of the respective segments, the particular segment is supplied with the image information and the segment can therefore reproduce the desired image in the area of the segment. This assures that the particular image of the stereo image is reproduced segment-wise and therefore the time between the reproduction of the image information for an eye is significantly reduced, for example, halved, and thereby the downtimes for an eye are greatly reduced. The unpleasant effect of flickering in the stereo image reproduction can thus be significantly reduced.

According to another embodiment, the display unit can be formed so that the time interval for the build-up of an image is selected greater than the time interval of the illumination of the pixel array for this image of the stereo image. This can assure that there is sufficient time in the gap between the illumination of the pixel array by a luminous source, and that the other luminous source can complete its illumination and thereby the reproduction of the other image of the stereo image safely and reliably. In this way, it is possible to realize a very pleasant reproduction of the stereo image.

According to yet another embodiment, stereo glasses with lenses can be selected depending on the number of people who want to use the system simultaneously for the reproduction of stereo images. The optical properties of the lenses in this regard are selected so that they are preferably identical to the optical properties of the corresponding filter in the display unit. As a result, an optimal use of the projected image information and brightness of images is achieved, so that the user(s) of the system of the invention for reproducing stereo images can perceive very good, bright, and true-color stereoperspective images.

It has also proven successful to make the glass lenses not completely identical in their filtering properties to those of the filters in the display unit but rather relative to one another. As a result, differences in the production quality or design can be utilized purposefully or can be used so that certain advantageous display situations can be achieved. For example, by a combination of filters in the display unit and in the glasses, which differ from one another by a permutation of individual limited transmitting intervals either in the blue or green or red color perception range in the corresponding filters, it is possible to reduce the image frame rate of the display unit, without an unpleasant flickering of stereo images being noticeable. The term entangled operation is also used here.

In this respect, the system for reproducing stereo images described hereinafter proved to be particularly preferred. It has filters of the display unit with a permutation of limited transmitting intervals of the filters in the blue or green or red color perception ranges and at least one pair of stereo glasses, which have filter properties, which are provided with 6 not permuted, transmitting intervals. Within the context of the mentioned permutation, an exchange of two transmitting intervals occurs between respective filters (right side vis-à-vis the left side or right image of the stereo image vis-à-vis the left image of stereo image) within a color, in other words, within color perception, whereby in addition at least one merging of two adjacent transmitting intervals into a common transmitting interval occurs, which spans two color perception ranges. Thus, the sum of the transmitting spectral intervals in the filter of the display unit is reduced, for example, from 6 to 5. According to an embodiment of the invention, now according to the permutation of the transmitting intervals, an exchange of the associated color image data to be presented is made, and as a result, an entanglement of the stereo image data with the two luminous sources of the display unit is achieved.

For example, if a permutation of the red transmitting intervals R1 and R2, therefore their exchange with the subsequent joining of the neighboring interval G2 with R1, is realized, then the image information, in other words, the color image data, for the presentation using R2 is now no longer carried out via the first luminous source and the pixel array, but via the second luminous source and the pixel array. This leads to a time shift in the presentation of this "permuted" color image data, because the images of the stereo image as created with the help of the respective luminous source and the pixel array each time are shown completely without permutation and always only individually in an alternating sequence, whereas this is eliminated because of the permutation. Because of the permutation, the time separation of the reproduction of the two images (left and right) of the stereo images is eliminated according to the invention. It is accomplished as a result that the time gaps between the presentation of the left image of the stereo image, which arise because the other right images of the stereo images are presented in the gap, are filled with images or picture information in the permuted color.

As a result, an unpleasant flickering of the reproduced stereo images is successfully prevented or reduced. Owing to this improved embodiment of the system for reproducing stereo images, it is possible to reduce the undesirably high refresh rate of the display unit per se, which greatly strains the components of the display unit, and thereby increases the lifetime of the system components.

It has proven successful in a suitable inventive manner to undertake the permutation not in the filters of the display unit but in the filters of the lenses of the stereo glasses. This leads to the corresponding advantages, as are also achieved in the previously mentioned embodiment of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
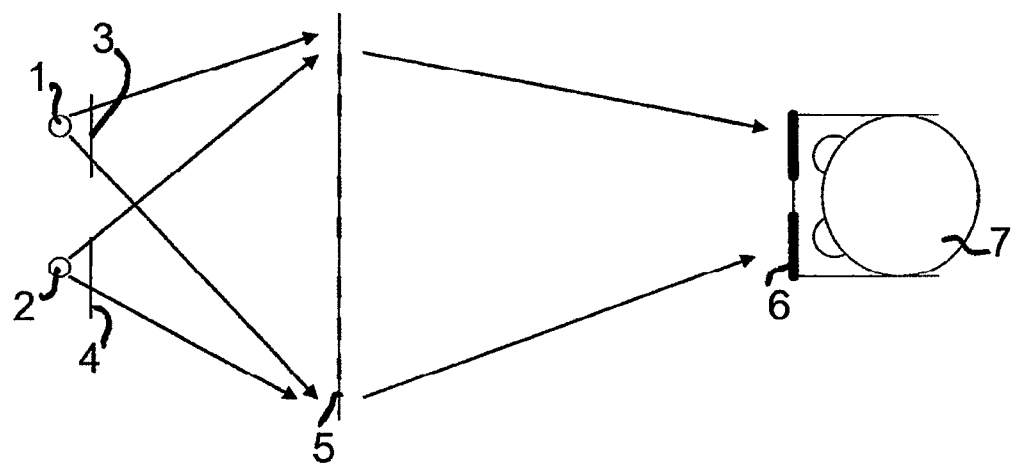
FIG. 1 shows a schematic depiction of a system for reproducing stereo images according to an embodiment of the invention.

The present invention enables the reasonably priced use of the wavelength-division multiplexing method with conventional display technologies. An exemplary system of the invention for reproducing stereo images is shown in FIG. 1.

In this system, two luminous sources 1 and 2 each with different orthogonal spectral properties are switched sequentially in a synchronous manner with two different image contents (right or left image of the stereo image), which are presented on an LCD pixel array 5. The different spectral ranges, orthogonal to one another, of the two luminous sources 1 and 2 are created by filters 3 and 4.

The image contents and spectral ranges of luminous sources 1 and 2 in this regard are synchronized in time so that a colored image, but individual for each eye, can be provided for both eyes of the viewer 7. The separation of the image contents at the viewer's eye occurs by glasses 6, whose lenses allow the spectral, ranges to pass through for the particular eye (right eye—right image or left eye—left image), and accordingly suppress the other spectral ranges.

In the simplest case, filter 1 of the display unit has the same three spectral transmission ranges as one of the lenses of glasses 6 and the other filter 2 of the display unit has the same spectral transmission ranges as the other lens of glasses 6. The transmission ranges are arranged in the spectrum so that they can span a large color space, on the one hand, and have no mutual passband, on the other (orthogonality). The transmission ranges of a filter are arranged in each case within the range of one color perception (red, green, blue) and have a half-width of about 30 nm typical for the invention.

While the LCD pixel array 5 presents the image content of the one eye, luminous source 1 is active and luminous source 2 deactivated, and while the LCD pixel array 5 a short time later presents the image for the other eye, luminous source 2 is active and luminous source 1 deactivated. The sequential alternation between these two operating modes occurs advantageously so rapidly that the user cannot perceive it. The image data are thereby reproduced in the time-division multiplexing operation by the LCD pixel array 5. The eye-selective separation of these stereo images, reproduced in the time-division multiplexing operation by the LCD pixel array 5, then occurs according to the invention according to the wavelength-division multiplexing concept.

Figure 2:
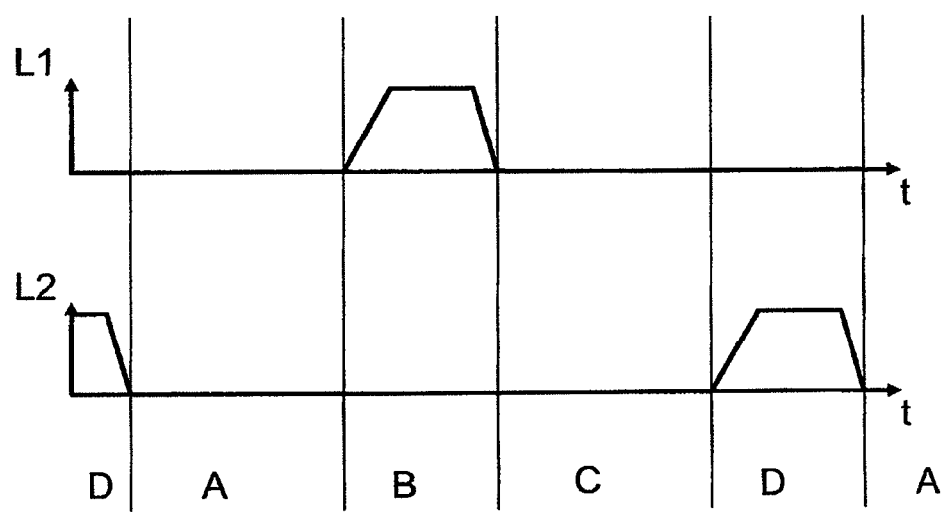
FIG. 2 shows a time course of activities of a display unit according to an embodiment of the invention.

The time course of the brightness of both luminous sources 1 and 2 is shown in FIG. 2. The three-dimensional image reproduction occurs in four phases:

Phase A describes the time for the data transmission of the image data to pixel array 5 and the settling time of the LCD cells.

In Phase B, luminous source 1 is active, illuminates the entire surface of pixel array 5 via the filter 3, and shows an image of the stereo image. Due to glasses 6, it is visible only for one eye with the corresponding eyeglass filter properties.

Phases C and D repeat these phases accordingly for luminous source 2 and for the image content, which is intended for the other eye.

Figure 3:
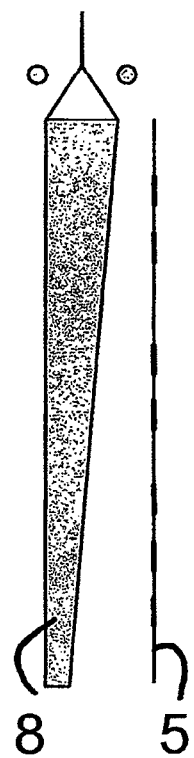
FIG. 3 shows an exemplary design of a display unit according to an embodiment of the invention with a light guide.
Figure 3A:
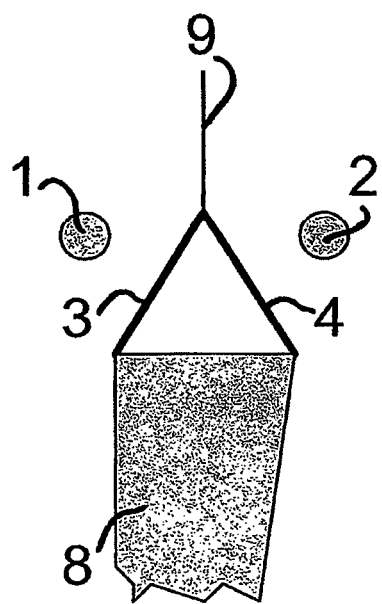
FIG. 3a shows an excerpt of FIG. 3 with the light guide.

The illumination of pixel array 5 can occur directly, as shown in FIG. 1, or by the uniform decoupling of light from a light guide 8 as depicted in FIG. 3. The section through a display unit or a part thereof is shown in FIGS. 3 and 3*a*.

Luminous source 1 couples into light guide 8 via filter 3; luminant 2 couples into light guide 8 also via filter 4. Both luminants are separated from one another by the light-tight boundary wall 9. If filters 3 and 4 are designed as interference filters, the light of the respective other luminous source 2 and 1 is reflected and also coupled into light guide 8. The front surfaces of light guide 8, through which the light of luminous sources 1, 2 are coupled, form a n-gon. The front surfaces of light guide 8 are each provided with a filter 3, 4 with spectral passbands orthogonal to one another, in that filters 3, 4 are glued flat to the front surfaces. Each filter 3, 4 in this regard is irradiated by its own luminous source 1, 2. The luminous bodies are separated from one another by a wall 9 made of an opaque material. An unwanted crosstalk is prevented thereby.

Luminous sources 1, 2 are formed in this case as, for example, rod-shaped light sources such as a gas-discharge lamp, a linear arrangement of LEDs, or a flash lamp.

Alternatively, LEDs with spectral white transmission or as a combination of several color LEDs selected in the appropriate spectral ranges are basically suitable for all types of coupling. In the second case, with a sufficient spectral purity of the color LEDs as a light source for luminous sources 1, 2, it is possible not to use filters 3 or 4 or to reduce the requirements in regard to selectivity. This also applies to any other type of spectral narrow-band luminous bodies. This provides a simplified design of the display unit.

Figure 4:
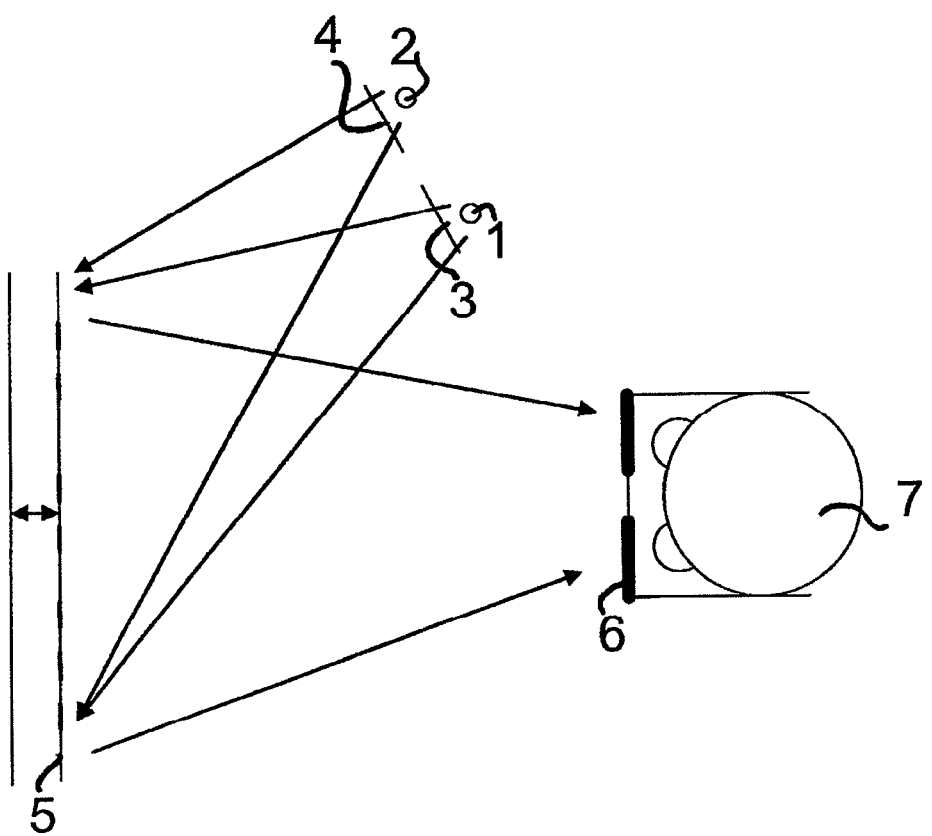
FIG. 4 shows a schematic depiction of another exemplary system for reproducing stereo images according to an embodiment of the invention.

In darkened environments, it is possible to drive pixel array 5 in the reflected light mode. In this case, luminous sources 1 and 2 and the associated filters 3 and 4 are located on the same side of pixel array 5 as the viewer 7. A full-surface uniform illumination is assured by the large distance from luminous sources 1, 2 to pixel array 5, which leads to a simple and cost-effective design according to FIG. 4.

Figure 9:
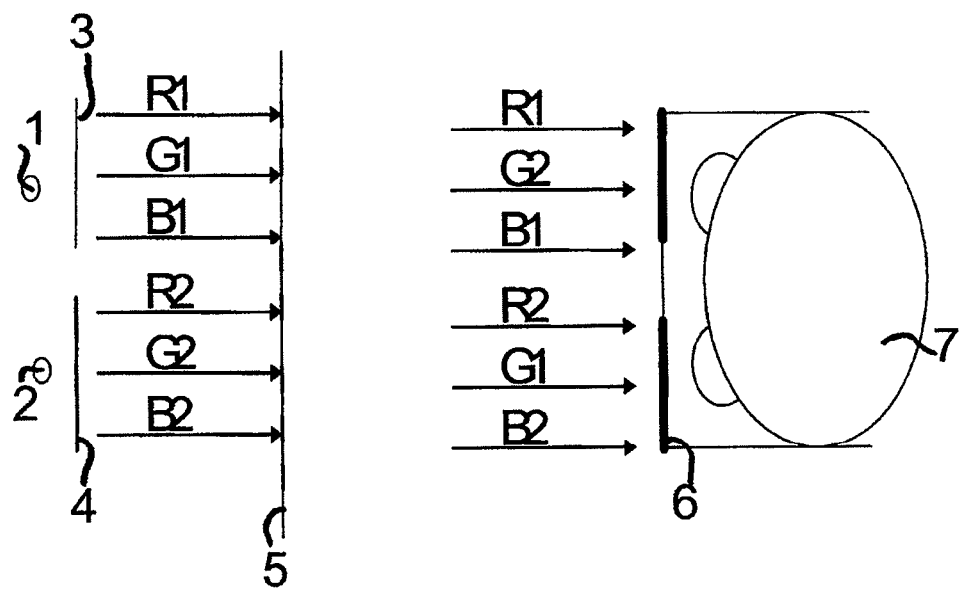
FIG. 9 shows a schematic depiction of another exemplary system according to an embodiment of the invention with an entangled operation.

Changes in brightness that are too slow are perceived as unpleasant by the eye. The refresh rate is limited, however, due to the inertia of the LCD cells of pixel array 5 and the electrical image transmission. If the filters of glasses 6 are designed so that one eye receives two spectral ranges from luminous sources 1 and a spectral range from luminous source 2 and the other eye two spectral ranges from luminous source 2 and a spectral range from luminous source 1, and that in phases A and B in each case two spectral ranges for the one eye and a spectral range for the other eye, and in phases C and D in each case two spectral ranges of the other eye and a spectral range of the one eye are shown on pixel array 5, then for each of the viewing eyes no abrupt change in total brightness occurs but only the change from a partial image with one spectral range to a partial image with two spectral ranges. Each eye thereby receives a more uniform luminous flux and does not become fatigued as rapidly as during switching between "off" and "illumination with all spectral lines." This is illustrated in FIG. 9. This operation can also be called an entangled operation.

Figure 5:
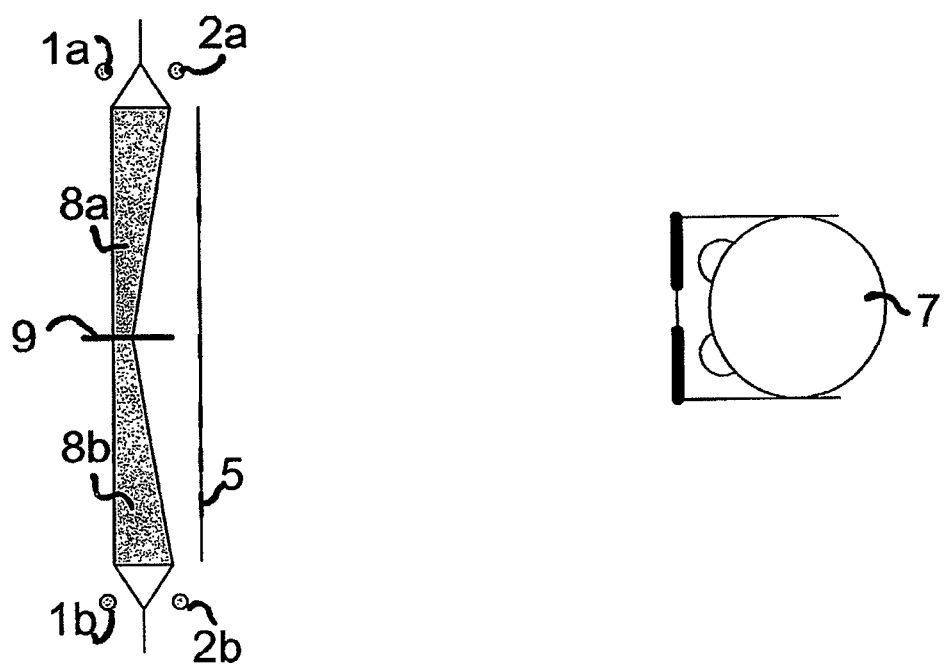
FIG. 5 shows a schematic depiction of another exemplary system for reproducing stereo images according to an embodiment of the invention with a segmented pixel array.

Depending on the implementation of the electronics, it is advantageous to divide the illumination by luminous sources 1 and 2 into two or more segments. As depicted by way of example in FIG. 5 for two segments, the illumination is subdivided in such a way that, whereas in the one segment the image is built up in one segment of pixel array 5, another segment can be illuminated. Segments 8*a* and 8*b* of light guide 8 are separated in a light-technology manner by a separating layer 9.

Figure 6:
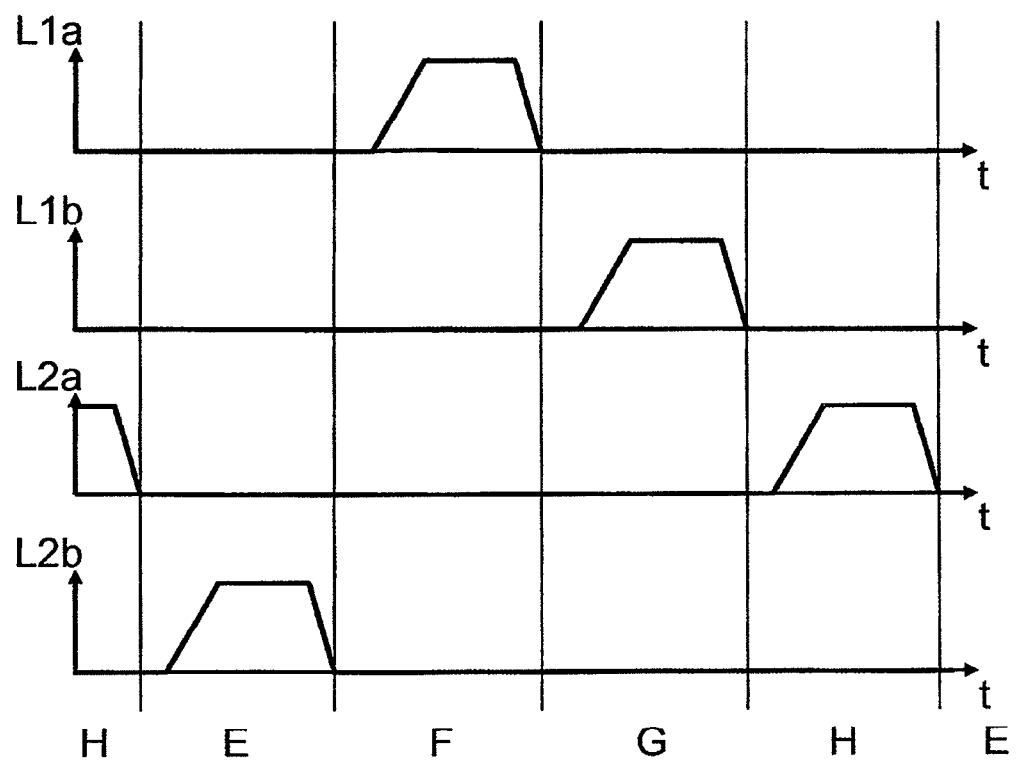
FIG. 6 shows a time course of the activities of the display unit of the invention from FIG. 5.

The time course is shown in FIG. 6 by way of example for an illumination in two segments. In this regard, in time domain (E) the lower field of pixel array 5 is illuminated with luminous source 2*b*, whereas the lower half represents the image for the second eye. At the same time, the upper half of the image is built up anew, so that it represents the content for the first eye.

In time domain (F), only the upper half of pixel array 5 is illuminated with luminous source 1*a*, whereas the lower half of the image is built up with the content for the first eye. In time domain (E), the lower field is illuminated with luminous source 1*b*, whereas the lower half represents the image for the second eye. At the same time, the upper half of the image is built up anew, so that it represents the content for the second eye.

In time domain (F), only the upper half of the display is illuminated with luminous source 2a, whereas the lower half of the image is built up with the content for the second eye. The image build-up and illumination then follow cyclically with the time domains E, F, G, . . . .

In the case of more than two segments, the image build-up occurs accordingly so that the illumination rapidly follows the image build-up of the appropriate site in the display by as constant a time as possible.

This segmentation of the invention with the associated control achieves the shortening of the downtimes or dark phases for an individual eye and thereby of creating a very pleasant stereo image reproduction behavior.

Figure 7:
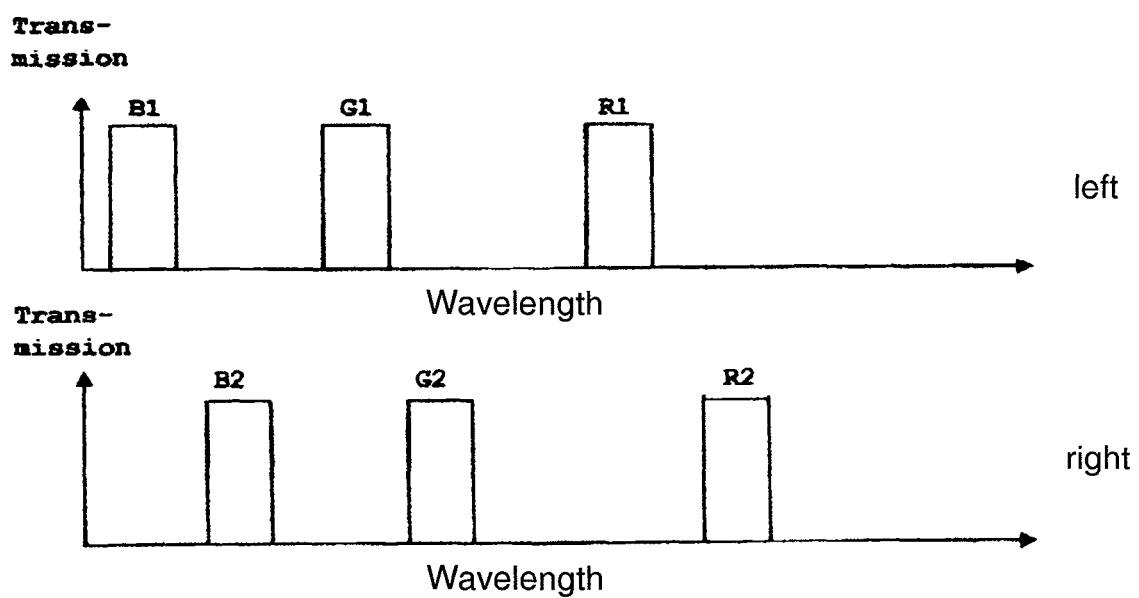
FIG. 7 shows an exemplary spectral distribution of the transmitting intervals of two orthogonal filters according to an embodiment of the invention.

Exemplary transmission ranges for filters 3, 4 are shown in FIG. 7. Filters 3, 4 represent Fabry-Perot interference filters, each of which have a filter characteristic formed orthogonal to one another. In this regard, a filter characteristic of both filters once for the left eye and thereby for the one image of the stereo image and once for the right eye and thereby for the other image of the stereo image is shown in FIG. 7, which are formed orthogonal to one another and therefore having no mutual overlap. The shown transmitting intervals B1, B2, G1, G2, R1, and R2 have no overlap and are distanced from one another so that both perspective partial images can be reproduced reliably separated from one another. The individual transmitting intervals B1, B2, G1, G2, R1 and R2 in this regard are realized as very narrow-band transmitting intervals with a bandwidth of about 20 nm half-width, of which the two intervals B1 and B2 are arranged within the blue color perception range, the two intervals G1 and G2 in the green color perception range, and the two intervals R1 and R2 in the red color perception range of the human eye. The interval R2 represents an outer and open transmitting interval, which has a steep edge and a clearly less steep edge, which is not shown here.

Figure 10:
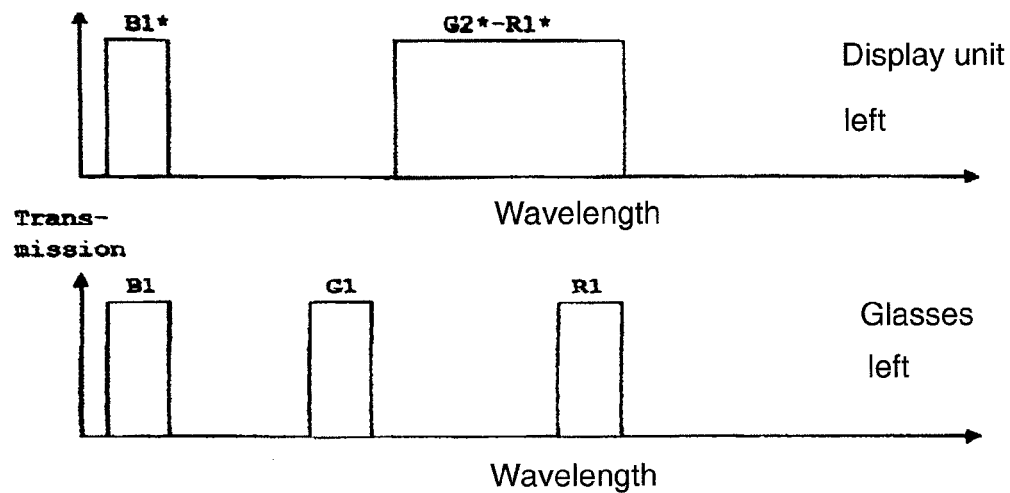
FIG. 10 shows a spectral distribution of the transmitting intervals according to an exemplary system according to an embodiment of the invention for stereo glasses and for a display unit with the entangled operation.
Figure 10:
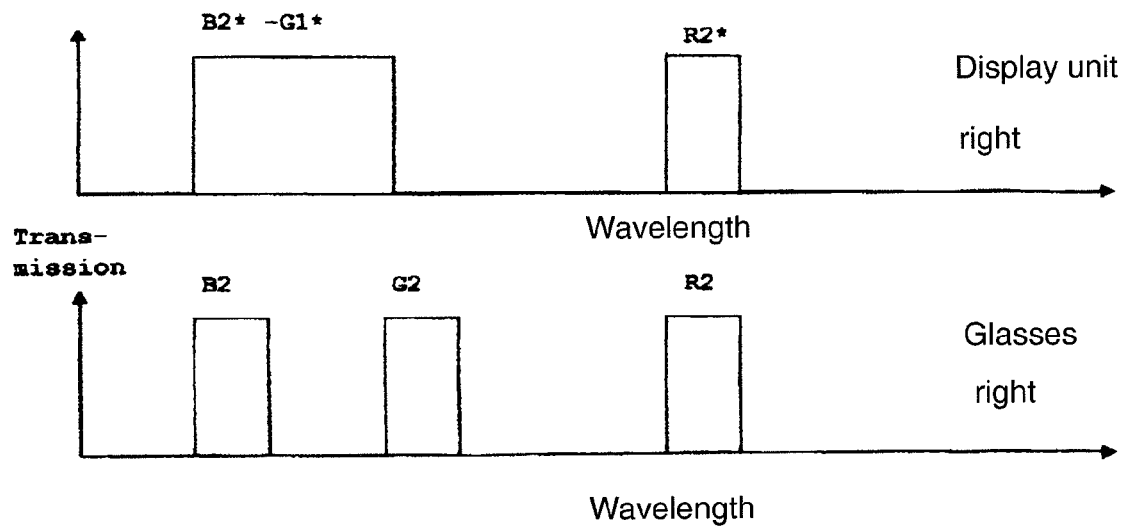

Proceeding from the color characteristics according to FIG. 7 with the 6 transmitting intervals, another color characteristic of the invention according to FIG. 10 is given by a type of channel permutation, namely, by a type of exchange of the interval R1 from the one image of the stereo image into the other image of the stereo image and the joining of R1 with the interval G2, whereas in turn the transmitting interval R2 is assigned to the other image of the stereo image.

Figure 8A:
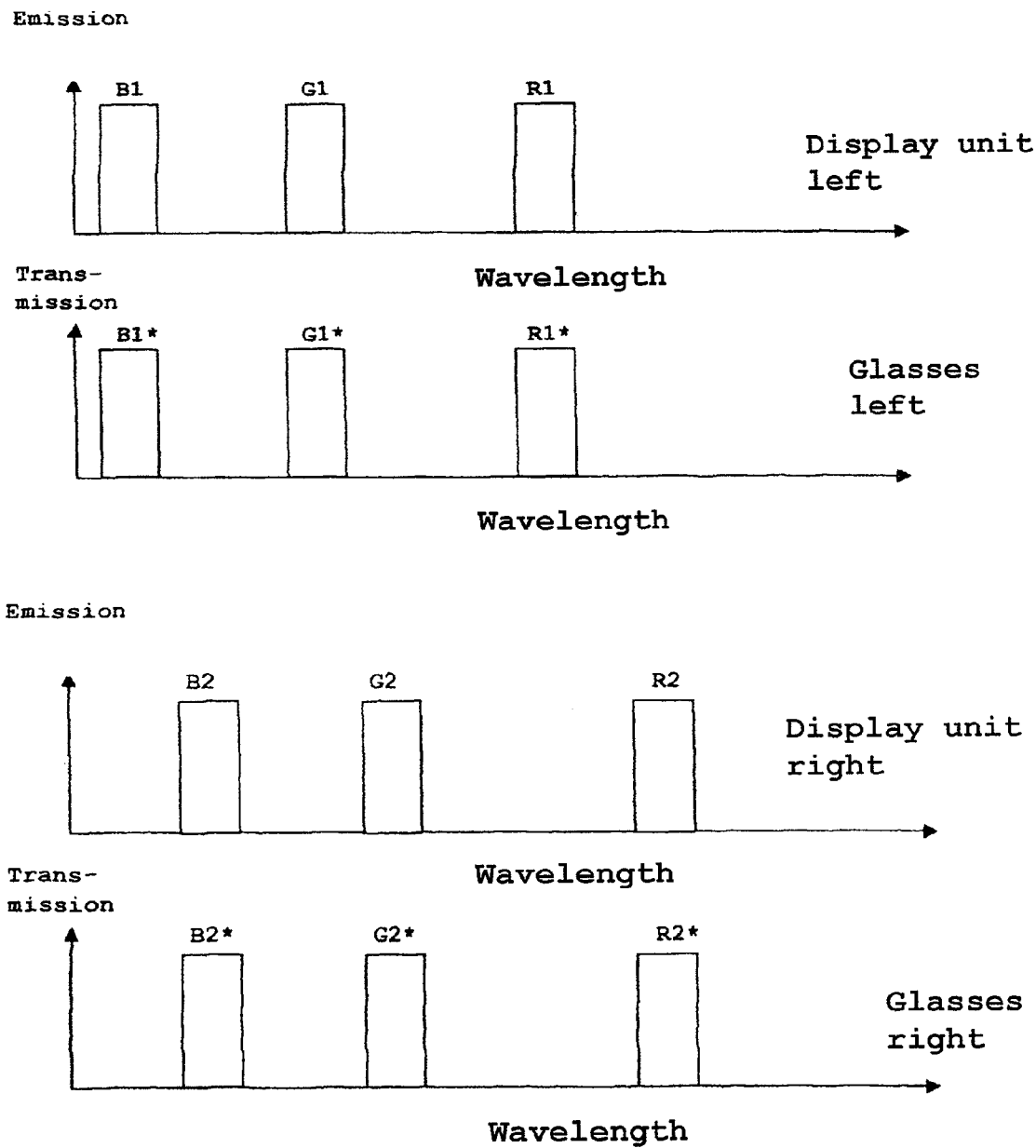
FIG. 8a shows a spectral distribution of the transmitting intervals for the stereo glasses and the display unit.

The transmitting intervals of a display unit and assigned stereo glasses are shown in FIG. 8a. In this regard, stereo glasses 6 have narrow, limited transmitting intervals B1*, G1*, R1* and B2*, G2*, R2*. The interference filters of the display unit also have 6 transmitting intervals B1, G1, R1 and B2, G2, R2, which are identical to the aforementioned intervals. In this regard, the x1 intervals (x=B, G, R) are assigned in each case to the left image of the stereo image or rather the "left" component of the display unit, whereas the x2 intervals are assigned to the "right" component. It is clear that the x1 intervals are formed orthogonal to the x2 intervals.

Figure 8B:
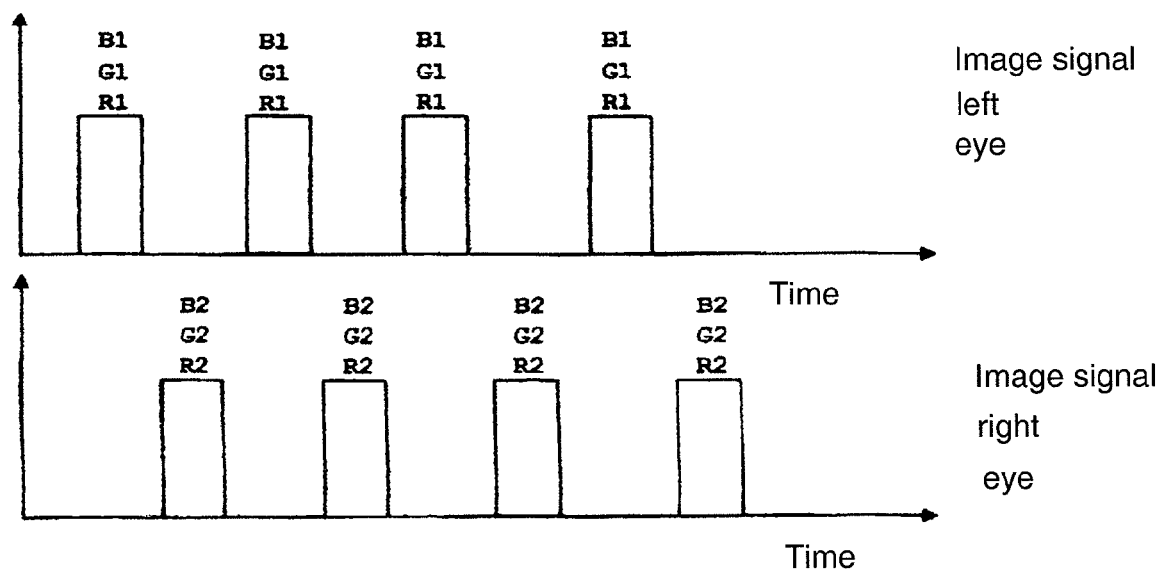
FIG. 8b shows a time sequence of the reproduced color image data to be perceived.

The time sequence of the depicted or perceptible image content of the individual images of the stereo image is shown in FIG. 8b. This is created, for example, by means of a system according to FIG. 1. The images of the stereo image, which are reproduced and perceptible with the use of the display unit of the system with the interference filters according to FIG. 8a, are reproduced alternately.

First, the left image of the stereo image with the image information B1, G1, R1, which is created with the use of the corresponding intervals, is reproduced. During this time period, no image or no image information and thereby no color image data are projected by the right image of the stereo image. Thereby, a right image of the stereo image is also not perceptible. Next, the right image of the stereo image with the color image data B2, G2, R2, which are created with the use of their corresponding intervals, is shown, whereas during this time period the left image of the stereo image is not shown. Accordingly, the right image of the stereo image alone can be perceived by the right lens of the stereo glasses, whereas no information of the left image of the stereo image can be perceived.

Then, the presentation of the other image of the stereo image occurs again and accordingly the interruption of the presentation of the image of the stereo image.

Because of this alternating presentation of the images of the stereo image, there are considerable time gaps for the perception of the particular image for the particular eye, which lead to an unpleasant flickering as soon as the time gaps are too long. To prevent this, the image frame rate of the display unit is selected as high. This high image frame rate leads to considerable stress on the components of the display unit. This stress leads to a reduced lifetime and to a greatly increased fragility of the display unit.

A spectral distribution of the interference filter spectra for the interference filters of the display unit of the system according to the invention or the interference filters of the lenses of the stereo glasses is shown in FIG. 10, in accordance with FIG. 8a.

The characteristics of the interference filters of the lenses of the stereo glasses have 6 narrow intervals according to FIG. 7, whereas the intervals of the interference filters of the display unit have only 4 transmitting intervals. In this regard, the interference filters of the display unit for the left image of the stereo image has a narrow interval B1*, whereas the other interval because of a permutation of G1* with G2* represents a relatively broad interval owing to a joining of the intervals G2* with the interval R1*.

A joined interval G1* with B2*, which is expanded by the single narrow interval R2*, arises in a corresponding manner for the interference filters of the display unit for the right image of the stereo image. The joined intervals extend into two color perception ranges. In addition, in this arrangement of the invention a permutation of the color image data is also carried out, so that accordingly the advantages named hereinafter can be achieved.

Figure 11:
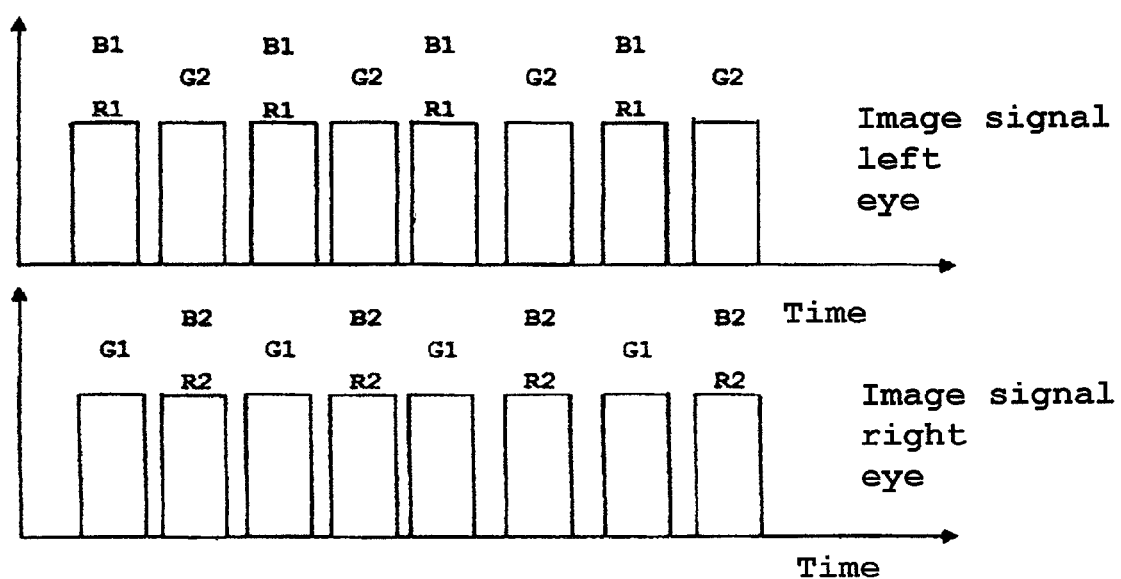
FIG. 11 shows a time sequence of the projected color image data, to be perceived, of an exemplary system according to an embodiment of the invention in an entangled operation.

In FIG. 11, the time sequence of the reproduced and perceptible stereo image information or rather color image data for the left eye or the right eye of a system of the invention for reproducing stereo images according to FIG. 1 is used.

The depiction in FIG. 11 is based on a spectral distribution of the transmitting intervals according to FIG. 10 for the filters in a display unit.

The wide interval R31 encompassing two color perception ranges, formed between G1 and B2, arises from a permutation of the intervals G1 with G2. The permuted interval G2 is combined with the interval R1 to form interval L32 and also comprises two color perception ranges. An arrangement, which has four transmitting intervals for both interference filters of the display unit, is created by this permutation with two subsequent poolings.

If now in addition the color image data, assigned to the interval G2, are permuted with the interval G1 and thereby presented with the use of the other interference filters, this leads to an alternating presentation and thereby possible perception of the color image data to the left eye, or the right eye, during which the color image data for the green color perception range alternate with the color image data for the other color perception ranges of red and blue. This occurs because of the additional permutation of the color image data so that the left eye can perceive only the information for the left eye, and accordingly this also applies to the right eye. It must be considered in this regard that no permutation of the intervals for the stereo glasses has occurred, as a result of which their optical properties correspond to the optical properties of the interference filters that were not permuted in the display unit. It is achieved by the described approach to close the gaps in the reproduction for the respective eye according to FIG. 8*b* and thereby to limit greatly the unwanted flickering.

The color image data G2 follow the color image data R1, B1 with a short lag and hereupon with a corresponding short time lag in turn the color image data R1, B1, G1, etc. This applies to the left eye and accordingly this also results for the right eye. A substantial gain in quality is achieved by this elimination of the long time intervals without a pronounced negative light stimulus by a pronounced dark phase. It is particularly advantageous in this respect that the negative aspect of the physiological delay in the perceptibility of images in this inventive solution is especially less disturbing, because the interruption of the brightness according to the invention is very short in time and thereby is not activated or activated only to a limited extent. Thereby, for physiological reasons the reproduced brightness can be largely detected, which is reflected in a reduced detected brightness. Thereby, a stereo image perceived subjectively as brighter is achieved as taught by the invention.

This design of the system moreover achieves, without an increase in the flickering tendency, the lowering of the image frame rate or the increasing, when required, of the resolution of the stereo image to be presented. Depending on the application, this can be carried out alternatively or also in combination. In this regard, the relationship between the image frame rate and the resolution must be considered to the effect that their product represents the constant maximum bandwidth of the transmitted image data. Accordingly, for example, the resolution can be increased by reducing the image frame rate.

A very comfortable and pleasant perception of stereo images is achieved by the described system, whereby the display unit of the system is notable moreover for a long lifetime and a comfortable and cost-effective realization.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for reproducing stereo images, the system comprising:
   a direct view display unit having a pixel array for presentation of image data, which reproduces data sequentially with stereoscopic image data in a controlled manner, and having a first luminous source and at least one second luminous source that are each configured to illuminate substantially a full-surface of the pixel array, the first luminous source and the second luminous source being configured to emit light in a plurality of narrow spectral ranges to thereby span a color space, the spectral ranges of the first and second luminous sources being orthogonal to one another such that they do not share a mutual passband;
   a control unit configured to drive the first and second luminous sources sequentially; and
   eyeglasses configured to reproduce the stereoscopic image data in an eye-selective manner to a wearer of the glasses, the eyeglasses having lenses, whose spectral passbands are formed orthogonal to one another and correspond to the spectral ranges of the first and second luminous sources,
   wherein the display unit has one or more light guides for light distribution in a direction of the pixel array, and wherein at least one of the light guides has at least two light entry surfaces, each of the light entry surfaces being associated with a corresponding one of the luminous sources such that the light from the separate luminous sources is coupled into the light guide through the different light entry surfaces and sequenced by the control unit to alternately illuminate the full area of the pixel array.

2. The system for reproducing stereo images according to claim 1, wherein the first and second luminous sources contain light-emitting diodes, fluorescent tubes, gas-discharge lamps, halogen lamps, or flash lamps.

3. The system for reproducing stereo images according to claim 1, wherein the first and second luminous sources contain broadband light sources to which with a plurality of narrow-band transmitting intervals are assigned.

4. The system for reproducing stereo images according to claim 3, wherein the transmitting intervals are arranged within a range, in each case, of a single color perception, blue (B), green (G), or red (R), and have a width of about 30 nm or less than 30 nm.

5. The system for reproducing stereo images according to claim 1, wherein the first and second luminous sources contain light sources, which directly generate and emit light in a plurality of narrow spectral ranges.

6. The system for reproducing stereo images according to claim 1, wherein the first and second luminous sources and the viewer are on different sides of the pixel array.

7. The system for reproducing stereo images according to claim 1, wherein for each of the light entry surfaces of at least one light guide, a filter with a plurality of narrow-band transmission ranges is assigned, wherein first and second light source are assigned to each filter, and wherein the first and second light sources are separated from one another by a separating element made of an opaque material.

8. The system for reproducing stereo images according to claim 1, wherein the pixel array is divided spatially into different segments, which are illuminated selectively and sequentially by the first and second luminous sources, and wherein the illuminated segments are activatable synchronously for image build-up.

9. The system for reproducing stereo images according to claim 1, wherein a time interval for a build-up of an image is selected to be greater than a time interval of an illumination of the pixel array for the image of the stereo image.

10. The system for reproducing stereo images according to claim 1, wherein at least one pair of stereo glasses is provided, whose lenses in their transmitting properties for a left and a right eye of a viewer correspond to those of both orthogonal spectral ranges of the first and second luminous sources for a particular image of a stereo image or are identical.

11. The system for reproducing stereo images according to claim 1, wherein at least one pair of stereo glasses is provided, whose lenses in their transmitting properties for a left and a right eye of a viewer correspond to those of both orthogonal spectral ranges of the first and second luminous sources for a particular image of a stereo image and have at least six limited spectral intervals, which are transmitted in pairs within a range of color perception, blue (B), green (G), and red (R), whereby the position of the transmitting intervals is different, a left image of the stereo image being formed via color image data R1, G1, B1 and a right image of the stereo image via color image data R2, G2, B2 with the use of the control unit,
- wherein R1 and R2 represent color image data with a red color, G1 and G2 represent color image data with a green color, and B1 and B2 represent color image data with a blue color,
- wherein the color image data of a color of both images of the stereo image are exchanged between respective filters as right-left pairs of image data so that the exchanged right color image data are presented with the use of the spectral ranges of the luminous source for the left image of the stereo image and vice versa,
- wherein the first and second luminous sources are configured such that at least one part of the exchanged color image data is transmitted and projected over two color perception ranges, and
- wherein the system is configured such that during an alternating use of both the first and second luminous sources, the left and right image of the stereo image is reproduced.

12. The system for reproducing stereo images according to claim 1, wherein the first and second luminous sources are separated from one another by a separating element made of an opaque material.

* * * * *